May 7, 1946.  J. K. LIVINGSTON  2,399,874
OCCUPANT-PROPELLED VEHICLE
Filed Sept. 2, 1943
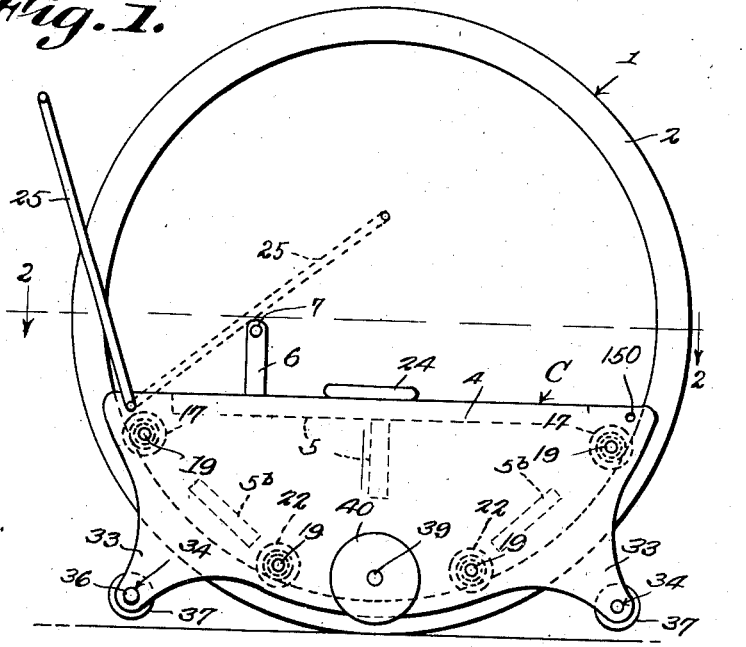
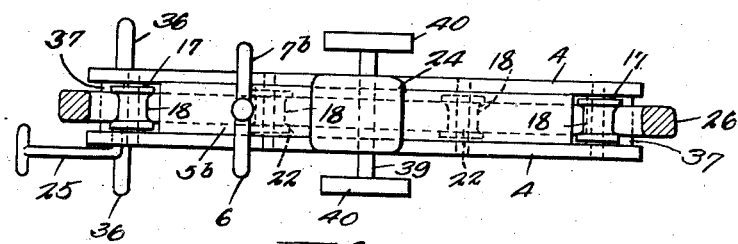
J. K. Livingston INVENTOR.
BY
ATTORNEYS.

Patented May 7, 1946

2,399,874

UNITED STATES PATENT OFFICE 2,399,874

OCCUPANT-PROPELLED VEHICLE

Jay K. Livingston, Houston, Tex.

Application September 2, 1943, Serial No. 500,987

2 Claims. (Cl. 280—206)

This invention aims to provide an occupant-propelled vehicle in which a large tread ring is rotated by the efforts of an operator seated within the contour of the ring, although the device is adapted to be operated as a cart. The invention aims, also, to provide a device of the class described which may be drawn by a tongue or the like, be operated by pedals under the control of a person occupying a seat on the device, be operated by shifting the weight of a person so located, or be operated forwardly or backwardly, by grasping and rotating the tread ring, the feet of the operator being placed on foot rests which are provided, this operation serving to strengthen the hands. The invention aims, further, to limit the lateral and front to back tilting.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 is a side elevation of the device.

Fig. 2 is a section on line 2—2, Fig. 1.

Referring to the drawing by characters of reference 1 designates a circular tread ring. The numeral C designates a carriage, located mostly within the periphery of the tread ring 1 and including side members 4 connected along their upper edges by an elongated spacer 5, and by other spacers 5b, located as desired. A post 6 is carried by the spacer 5 and is provided with handle bars 7 or any other steering instrumentality. The side members are disposed on opposite sides of the tread ring 1. The side members 4 do not extend downwardly into contact with the surface over which the tread ring 1 rolls.

Auxiliary wheels 17 are located, respectively, in the front and back portion of ring 1, and may be grooved circumferentially, as at 18, to fit upon the tread ring 1. It is not necessary that the wheels 17 be grooved circumferentially. To the auxiliary wheels 17 are secured shafts 19, journaled in the carriage members 4.

The carriage assembly C is supported from the ring 1 by means of the wheels 17.

The carriage C remains practically stationary, and the ring 1, being rotated by the pedals 10 and the main wheel 11, furnishes the necessary locomotion. The wheels 17 prevent the carriage C from tilting from front to back on the shaft 8. This operation would take place imperfectly if the wheels 17 were omitted, but, then, the carriage C would drag on the ground and prevent a free rotation of the tread ring 1. It will be noted that the carriage C is narrow, and does not demand that the operator shall sprawl his legs widely apart. The carriage C may be of any desired shape dictated by fancy or by a desire for ornamentation.

Since none of the wheels 17 touch the supporting surface, the device is balanced at the point of contact between the tread ring 1 and the supporting surface.

It is possible for a person other than the operator to lift the entire device clear of the ground, while a child gripping the handle bars 7 is occupying a seat or saddle 24 supported by the members 4. The entire device may then be swung in the hand of the operator, and the carriage C may be caused to tilt backwardly or forwardly.

There may be any desired number of the wheels 17 and their cross section at the periphery may be governed by the cross section of the tread ring 1. The direction in which the tread ring 1 rotates may be regulated if the carriage C is shifted at starting, due to the operator changing the center of mass of his body, as he occupies the seat 15, with his feet on the pedals 10. Whilst the device is being operated by the pedals 10, there is a corresponding shift of center of mass in the carriage C and its occupant.

Small wheels 22, located between the wheels 17, are provided, and make contact with the inner portion of the tread ring 1.

Near their forward and rear upper corners, the side members 4 have small openings 150, which permit the insertion of the transverse lower part of a tongue 25. The tongue being omitted, the device is a so-called "kiddie car" or foot-propelled vehicle. When the tongue 25 is employed, the device may be pulled or pushed like a cart, or the device may be operated forwardly or backwardly by grasping and rotating the tread ring 1, the foot of the operator being placed on the foot rests 36, hereinafter mentioned. The tongue 25 may be attached without difficulty, and is readily removable. The tongue 25 may be swung backwardly until it rests on the handle bar 7, and it is of such length that it then will extend alongside the seat 24, in elevated relation to the seat, and form a rest, against which an occupant of the seat may lean, to steady himself. Since the tongue extends along one side only of the seat, the occupant of the seat may vacate it quickly and easily, upon occasion.

The side plates 4 of the carriage C are provided at their lower corners with extensions or projections 33, carrying shafts 34, one shaft being a rear shaft, and the other shaft being a forward shaft. Foot rests 36 are placed conveniently on the forward portion of the carriage C, and may be of any desired form. As shown, but not of necessity, there may be lateral extensions of one of the shafts 34. Supplemental wheels 37 are carried by the shafts 34. The supplemental wheels 37 are carried by the shafts 34. The supplemental wheels 37 are in a common vertical plane with the tread ring 1. Below the center of rotation of the tread ring 1 and close to the bottom of the carriage C, a shaft 39 is mounted and carries wheels 40. The shaft 39 is long enough so that the wheels 40 are disposed outwardly of the side members 4 of the carriage C. All of the wheels 37 and 40 are so located as to be clear of the supporting surface, when the tread ring 1 moves upon it, with the device in the balanced position of Fig. 1.

When the device is being drawn forwardly by means of the tongue 25, the wheels 40, coming into contact with the ground or similar surface, limit the lateral tilting movement of the device, the wheels 37 limiting the tilting movement of the device in a plane at right angles to the axis of rotation of the tread ring 1.

The wheels 37 keep the carriage assembled with the tread ring.

What is claimed is:

1. In an occupant-propelled vehicle, a tread ring, a carriage located within the ring, wheels journaled on the carriage and engaging the inner surface of the ring, a handle mounted on the carriage, a seat mounted on the carriage, to the rear of the handle, and a towing device pivotally connected to the carriage for vertical swinging movement, the towing device being rearwardly movable, and being of such length as to rest on the handle and extend alongside the seat to afford lateral support for an occupant of the seat.

2. In an occupant-propelled vehicle, a tread ring, a carriage within the ring and comprising parallel side members, an elongated spacer between the upper portions of the side members, and having its ends spaced from the ring, a seat mounted on the spacer and on the side members, a handle mounted on the spacer and located in front of the seat, ring-engaging wheels mounted to rotate between the side members and located on opposite sides of a vertical line passing through the center of rotation of the ring, ground-engaging wheels journaled on the carriage and located, respectively, in front of and behind the lowermost portion of the ring, the lowermost portions of the ground-engaging wheels being located at a slightly greater height than the lowermost portions of the ring, to clear the ground, but to limit a tilting of the carriage from front to back, the ground-engaging wheels being disposed below the lower portion of the ring, to maintain the carriage assembled with the ring, and other ground-engaging wheels supported on opposite sides of the carriage and outwardly thereof, at sufficient distances from the carriage to enable them to serve as means for limiting the lateral tilting of the ring.

JAY K. LIVINGSTON.